United States Patent
Kanja et al.

(10) Patent No.: US 10,184,774 B2
(45) Date of Patent: Jan. 22, 2019

(54) CORRECTING APPARATUS AND CORRECTING METHOD

(71) Applicant: Roland DG Corporation, Hamamatsu-shi, Shizuoka (JP)

(72) Inventors: Tetsuya Kanja, Hamamatsu (JP); Kenta Nakane, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 318 days.

(21) Appl. No.: 15/350,295

(22) Filed: Nov. 14, 2016

(65) Prior Publication Data

US 2017/0138717 A1 May 18, 2017

(30) Foreign Application Priority Data

Nov. 17, 2015 (JP) .................................. 2015-224722

(51) Int. Cl.
*G01B 5/004* (2006.01)
*G01B 5/008* (2006.01)
*G01B 5/012* (2006.01)

(52) U.S. Cl.
CPC ............. *G01B 5/012* (2013.01); *G01B 5/004* (2013.01); *G01B 5/008* (2013.01)

(58) Field of Classification Search
CPC ......... G01B 5/012; G01B 5/008; G01B 5/004
See application file for complete search history.

(56) References Cited

U.S. PATENT DOCUMENTS

2013/0151001 A1* 6/2013 Haase .................. G01B 21/042
700/192

FOREIGN PATENT DOCUMENTS

| JP | 04-171161 A | 6/1992 |
|---|---|---|
| JP | 2006-349388 A | 12/2006 |
| JP | 2016-049614 A | 4/2016 |

* cited by examiner

*Primary Examiner* — Paul M. West
(74) *Attorney, Agent, or Firm* — Keating & Bennett, LLP

(57) ABSTRACT

A correcting apparatus includes: a detecting pin; a microcomputer configured or programmed to acquire a first coordinate value indicative of a first coordinate of a detection point, and a first height, and to acquire a second coordinate value indicative of a second coordinate of the detection point, and a second height; to rotate the detecting pin by 180 degrees, and to acquire, with the detecting pin rotated by 180 degrees, a third coordinate value indicative of a third coordinate of the detection point, and a fourth coordinate value indicative of a fourth coordinate of the detection point; to generate, in accordance with the values acquired, a first linear equation including a third height as a variable; and to correct a fifth coordinate value indicative of a coordinate of a measurement point using the first linear equation.

13 Claims, 9 Drawing Sheets

CORRECTING APPARATUS AND CORRECTING METHOD

CROSS REFERENCE TO RELATED APPLICATIONS

This application claims priority to Patent Application No. 2015-224722 filed in Japan on Nov. 17, 2015, the entire contents of which are hereby incorporated by reference.

BACKGROUND OF THE INVENTION

1. Field of the Invention

The present invention relates generally to correcting methods and correcting apparatuses, and more particularly to a correcting method and a correcting apparatus that correct a coordinate value detected by a detecting pin.

2. Description of the Related Art

A machining apparatus known in the related art uses, for example, a microcomputer to carry out numerical control in three-dimensionally machining a work in accordance with predetermined data. Such a machining apparatus includes: a spindle equipped with a tool; and a holder to hold a work. The machining apparatus three-dimensionally changes the relative positions of the tool-equipped spindle and the work in machining the work with the tool, thus forming the work into a desired shape.

Positioning of target components of a machining apparatus, such as a spindle and a holder, is effected at a predetermined time, such as at the time of shipment from a factory or parts replacement. Such a positioning process involves: acquiring a coordinate value of a measurement point preset for positioning; and calculating a correction value for positioning from the acquired coordinate value and a previously stored measurement point coordinate value. The correction value will hereinafter be referred to as a "positioning correction value" when appropriate. The target components are positioned in accordance with the positioning correction value calculated.

The measurement point coordinate value is acquired using a detecting pin mounted on the spindle. The machining apparatus acquires the coordinate value of a spot where the detecting pin has come into contact with the measurement point.

Unfortunately, the detecting pin may be obliquely mounted on the spindle, which causes the shaft of the detecting pin to get out of alignment. A measurement point detected by such a detecting pin results in an inaccurate measurement point coordinate value, unlike a measurement point detected by a detecting pin properly mounted on the spindle (i.e., a detecting pin whose shaft extends vertically). Thus, the use of a positioning correction value calculated from the inaccurate measurement point coordinate value will disadvantageously not enable proper positioning of the target components.

To solve such a problem, a known method involves calculating a correction value to correct a coordinate value detected by a detecting pin whose shaft is out of alignment. The correction value calculated will hereinafter be referred to as a "shaft misalignment correction value" when appropriate. The known method further involves correcting a coordinate value of a measurement point using the shaft misalignment correction value, and then calculating a positioning correction value using the measurement point coordinate value corrected.

In acquiring the shaft misalignment correction value, a spindle is first moved such that a detecting pin comes into contact with a detection point set in advance for shaft misalignment correction value calculation, thus acquiring a coordinate value of the detection point. Subsequently, the spindle is rotated around the Z axis so as to rotate the detecting pin by 180 degrees. The spindle in this state is moved such that the detecting pin comes into contact with the detection point again, thus acquiring a coordinate value of the detection point. From the two coordinate values acquired, the shaft misalignment correction value is calculated. Using the shaft misalignment correction value calculated, the measurement point coordinate value is corrected.

The upper and lower ends of the detecting pin whose shaft is out of alignment, however, have different degrees of misalignment unlike the upper and lower ends of a detecting pin whose shaft is in alignment. The degree of misalignment of the detecting pin whose shaft is out of alignment increases as the detecting pin extends to its lower end (or its tip). Suppose that the position of contact of the detecting pin with the detection point when the detection point is detected and the position of contact of the detecting pin with the measurement point when the measurement point is detected are different in the up-down direction. In this case, the measurement point coordinate value will not be corrected properly, resulting in improper positioning of target components. In view of the foregoing, there is a need for a correcting method and a correcting apparatus that enable a coordinate value detected by a detecting pin to be corrected more properly than before.

SUMMARY OF THE INVENTION

Accordingly, preferred embodiments of the present invention provides a correcting method and a correcting apparatus that enable a coordinate value detected by a detecting pin to be corrected more properly than before.

A correcting apparatus according to a preferred embodiment of the present invention includes a spindle, a detecting pin, a first detection point, a first measurement point, and a microcomputer. The spindle is rotatable around a Z axis of an X, Y and Z orthogonal coordinate system. The detecting pin is detachably mounted on the spindle. The detecting pin includes a first point and a second point located at different positions along the Z axis. The first detection point is to be brought into contact with the detecting pin. The first measurement point is to be brought into contact with the detecting pin. The microcomputer is configured or programmed to move the detecting pin along an X axis of the X, Y and Z orthogonal coordinate system to bring the first point of the detecting pin into contact with the first detection point, to acquire a first coordinate value indicative of a first coordinate of the first detection point and acquire a first height. The first height is a Z axis length of the detecting pin measured from a lower end of the detecting pin to the first point. The microcomputer is also configured or programmed to move the detecting pin along the X axis to bring the second point of the detecting pin into contact with the first detection point, acquire a second coordinate value indicative of a second coordinate of the first detection point and acquire a second height. The second height is a Z axis length of the detecting pin measured from the lower end of the detecting pin to the second point. The microcomputer is also configured or programmed to rotate the detecting pin by 180 degrees around the Z axis. The microcomputer is also configured or programmed to move the 180-degree rotated detecting pin along the X axis to bring the first point of the detecting pin into contact with the first detection point, and acquire a third coordinate value indicative of a third coordinate of the first detection point. The microcomputer is also configured or programmed to move the 180-degree rotated detecting pin along the X axis to bring the second point of the detecting pin into contact with the first detection point, and acquire a fourth coordinate value indicative of a fourth coordinate of the first detection point. The microcomputer is also configured or programmed to generate a first linear equation in accordance with the first coordinate value, the second coordinate value, the third coordinate value, the fourth coordinate value, the first height, and the second height. The first linear equation includes a third height as a variable. The third height is a Z axis length of the detecting pin measured from the lower end of the detecting pin to a predetermined point of the detecting pin. The microcomputer is also configured or programmed to correct a fifth coordinate value indicative of a coordinate of the first measurement point using the first linear equation. The fifth coordinate value is obtained by bringing the predetermined point of the detecting pin into contact with the first measurement point.

A correcting method according to a preferred embodiment of the present invention is a coordinate value correcting method to cause a correcting apparatus to: move a detecting pin along an X axis of an X, Y and Z orthogonal coordinate system to bring a first point of the detecting pin into contact with a first detection point, and acquiring a first coordinate value indicative of a first coordinate of the first detection point and acquiring a first height, the first height being a Z axis length of the detecting pin measured from a lower end of the detecting pin to the first point, and move the detecting pin along the X axis to bring a second point of the detecting pin into contact with the first detection point, and acquire a second coordinate value indicative of a second coordinate of the first detection point and acquiring a second height, the second height being a Z axis length of the detecting pin measured from the lower end of the detecting pin to the second point; rotate the detecting pin by 180 degrees around the Z axis, move the 180-degree rotated detecting pin along the X axis to bring the first point of the detecting pin into contact with the first detection point, and acquire a third coordinate value indicative of a third coordinate of the first detection point, and generate a first linear equation in accordance with the first coordinate value, the second coordinate value, the third coordinate value, the fourth coordinate value, the first height, and the second height, the first linear equation including a third height as a variable, the third height being a Z axis length of the detecting pin measured from the lower end of the detecting pin to a predetermined point of the detecting pin; and correct a fifth coordinate value indicative of a coordinate of the first measurement point using the first linear equation, the fifth coordinate value being obtained by bringing the predetermined point of the detecting pin into contact with the first measurement point.

Various preferred embodiments of the present invention provide a correcting method and a correcting apparatus that enable a coordinate value detected by a detecting pin to be corrected more properly than before.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
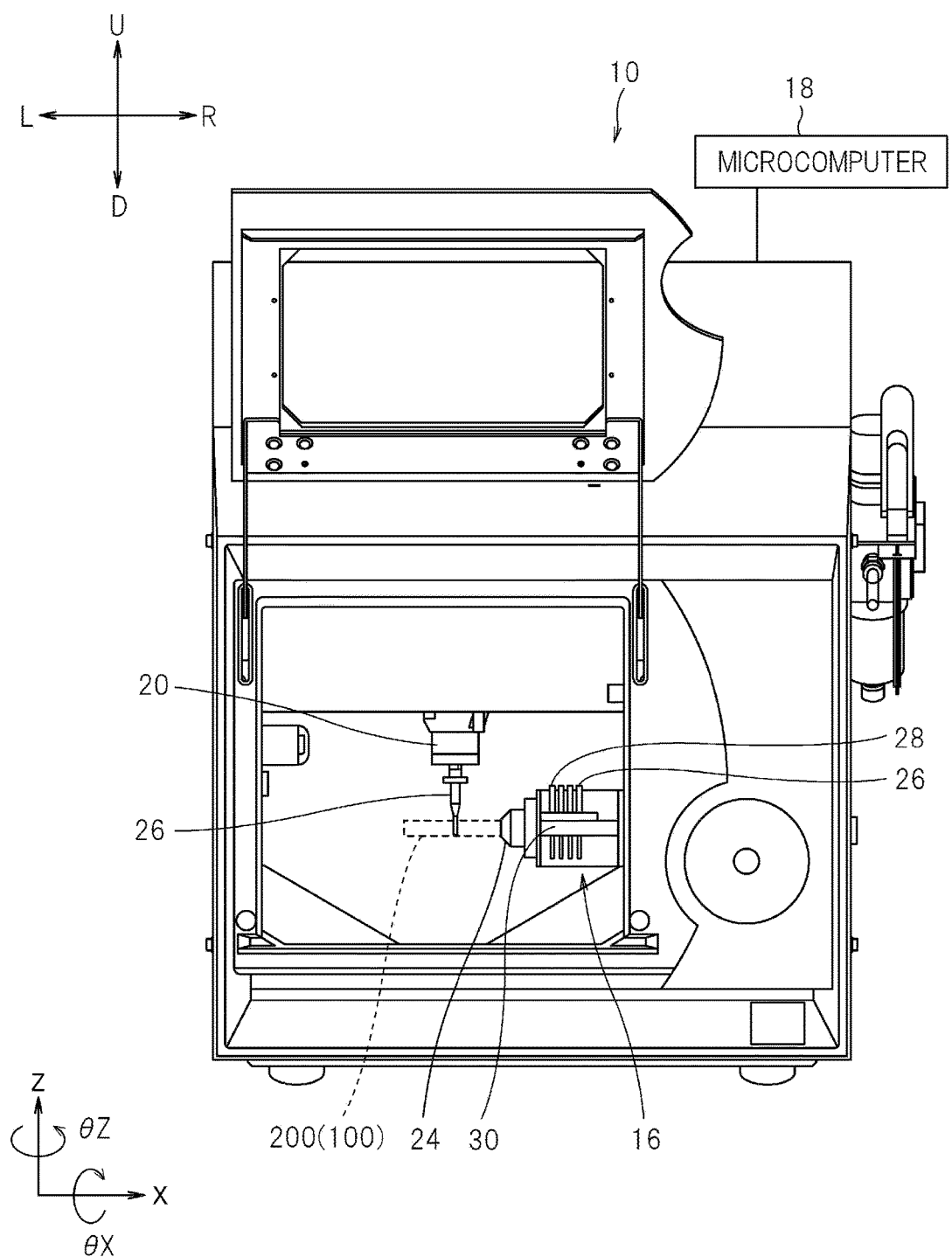
FIG. 1 is a front view of a machining apparatus that performs a correcting method according to a preferred embodiment of the present invention.
Figure 2:
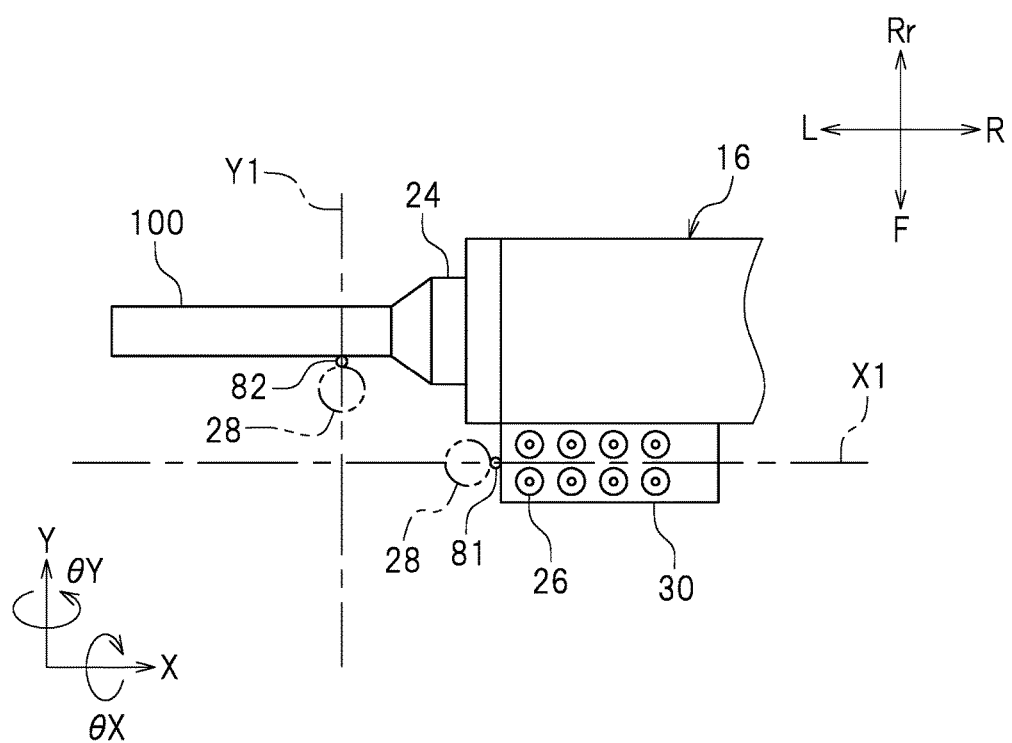
FIG. 2 is a plan view of a work holder according to a preferred embodiment of the present invention and its adjacent components.

Correcting methods and correcting apparatuses according to preferred embodiments of the present invention will be described below with reference to the accompanying drawings. FIG. 1 is a front view of a machining apparatus 10 that performs correcting methods according to a preferred embodiment of the invention. The machining apparatus 10 is a non-limiting example of a correcting apparatus. FIG. 2 is a plan view of a work holder 16 according to this preferred embodiment and its adjacent components. The preferred embodiments described herein are naturally not intended to limit the present invention in any way. Components and elements having the same functions are identified by the same reference signs, and description thereof will be simplified or omitted when deemed redundant.

Unless otherwise specified in the following description, the right, left, upper, and lower portions of FIG. 1 respectively correspond to the right, left, upper, and lower portions of the machining apparatus 10. The right, left, upper, and lower portions of FIG. 2 respectively correspond to the right, left, rear, and front portions of the work holder 16. The reference signs F, Rr, R, L, U, and D in the drawings respectively represent front, rear, right, left, up, and down.

The reference sign X in the drawings represents the X axis of an X, Y and Z orthogonal coordinate system, i.e., the right-left direction. The reference sign Y in the drawings represents the Y axis of the X, Y and Z orthogonal coordinate system, i.e., the front-rear direction. The reference sign Z in the drawings represents the Z axis of the X, Y and Z orthogonal coordinate system, i.e., the up-down direction. The reference signs θx, θy, and θz respectively represent the direction of rotation around the X axis, the direction of rotation around the Y axis, and the direction of rotation around the Z axis. In the present preferred embodiment, the X, Y and Z axes are set so that any one of the X, Y and Z axes is perpendicular to the other two of the X, Y and Z axes. Alternatively, the X, Y and Z axes may be set so that any one of the X, Y and Z axes intersects with the other two of the X, Y and Z axes. These directions and axes are defined merely for the sake of convenience of description and do not limit in any way how the machining apparatus 10 may be installed.

As illustrated in FIG. 1, the machining apparatus 10 preferably includes the work holder 16, a spindle 20, machining tools 26, detecting pins 28, and a magazine 30. The work holder 16 is an example of a "holder". Each machining tool 26 is an example of a "tool". The magazine 30 is an example of a "container".

The work holder 16 is movable in the Y axis. The work holder 16 preferably includes a rotary member 24. The rotary member 24 is rotatable around the X axis of the X, Y and Z orthogonal coordinate system. The work holder 16 holds one of a work 200 and a correction jig 100. More specifically, the rotary member 24 holds one of the work 200 and the correction jig 100.

The spindle 20 is movable along the X axis and the Z axis. The spindle 20 is rotatable around the Z axis. One of the machining tools 26 and the detecting pins 28 is detachably mounted on the spindle 20. The machining tool 26 or the detecting pin 28 mounted on the spindle 20 rotates around the Z axis together with the spindle 20. Upon contact of the detecting pin 28 mounted on the spindle 20 with a first detection point 81 (see FIG. 2) on the magazine 30 or a second detection point 82 (see FIG. 2) on the correction jig 100, the detecting pin 28 detects electrical conduction. The first detection point 81 and the second detection point 82 are each made of a metal material.

The magazine 30 is fixed to the work holder 16. The magazine 30 moves together with the work holder 16. The magazine 30 contains the machining tools 26 and the detecting pins 28.

The machining apparatus 10 preferably further includes a microcomputer 18. The microcomputer 18 is configured or programmed to control all operations of the machining apparatus 10 including operations of the work holder 16 and the spindle 20.

In detecting a coordinate value of the first detection point 81, the microcomputer 18 moves the spindle 20, on which the detecting pin 28 is mounted, such that the detecting pin 28 comes into contact with the first detection point 81. In detecting a coordinate value of the second detection point 82, the microcomputer 18 moves the spindle 20, on which the detecting pin 28 is mounted, such that the detecting pin 28 comes into contact with the second detection point 82. The microcomputer 18 acquires a coordinate value of the detecting pin 28 when the detecting pin 28 is in contact with the first detection point 81 and detects electrical conduction. This coordinate value is determined to be the coordinate value of the first detection point 81. The microcomputer 18 acquires a coordinate value of the detecting pin 28 when the detecting pin 28 is in contact with the second detection point 82 and detects electrical conduction. This coordinate value is determined to be the coordinate value of the second detection point 82.

The microcomputer 18 corrects coordinate values of measurement points detected by the detecting pin 28 (e.g., the first detection point 81 and the second detection point 82), and effects positioning of target components. As used herein, the term "positioning of target components" refers to determining relative positions of the spindle 20, the work holder 16, and the magazine 30.

Figure 3:
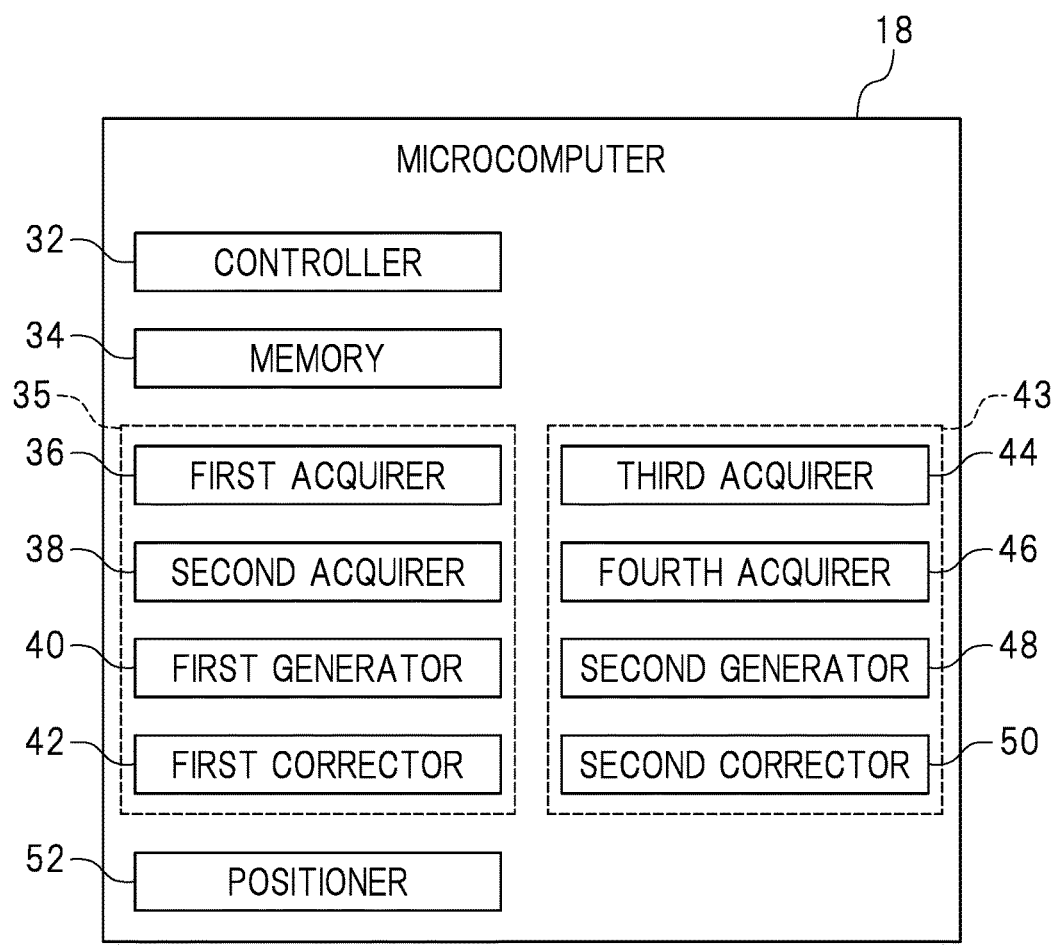
FIG. 3 is a block diagram of a microcomputer according to a preferred embodiment of the present invention.

FIG. 3 is a block diagram of the microcomputer 18. The microcomputer 18 preferably is configured or programmed to a controller 32, a memory 34, an X coordinate value corrector 35, a Y coordinate value corrector 43, and a positioner 52.

The controller 32 controls operations of the spindle 20 and the work holder 16 in accordance with various information, such as machining data.

The memory 34 stores various information, such as machining data and coordinate values of measurement points.

The X coordinate value corrector 35 preferably includes a first acquirer 36, a second acquirer 38, a first generator 40, and a first corrector 42. The X coordinate value corrector 35 moves the spindle 20 grasping the detecting pin 28 so as to acquire the coordinate value of the first detection point (or X reference detection point) 81 on the magazine 30. As illustrated in FIG. 2, in acquiring the coordinate value of the first detection point 81, the X coordinate value corrector 35 controls the spindle 20 such that the detecting pin 28 moves along a straight line X1. The straight line X1 extends in parallel or substantially parallel with the X axis and passes through the first detection point 81.

Figure 4A:
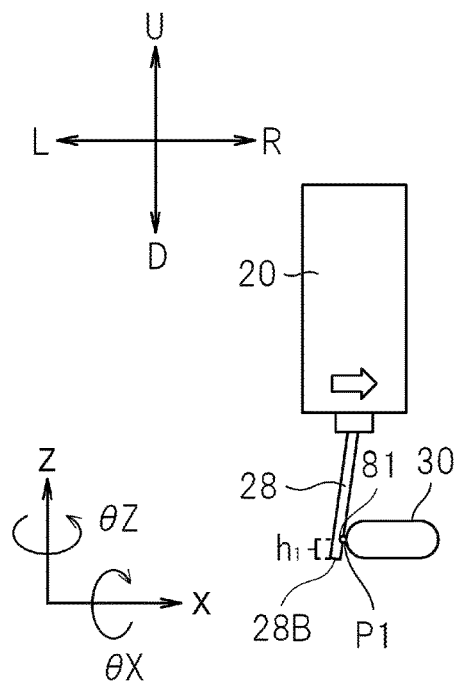
FIG. 4A is a schematic diagram illustrating how a detecting pin comes into contact with an X reference detection point so as to detect an X coordinate value $x_{1,\,0}$.
Figure 4B:
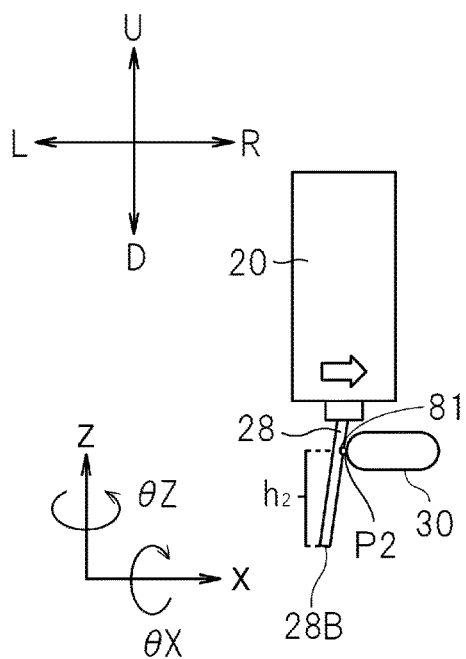
FIG. 4B is a schematic diagram illustrating how the detecting pin comes into contact with the X reference detection point so as to detect an X coordinate value $x_{2,\,0}$.

The detecting pin 28 preferably includes a first point P1 and a second point P2 located at different positions along the Z axis. As illustrated in FIG. 4A, the first acquirer 36 moves the detecting pin 28 along the X axis so as to bring the first point P1 of the detecting pin 28 into contact with the first detection point 81 on the magazine 30. Thus, the first acquirer 36 acquires a first coordinate value $x_{1,0}$ indicative of a first coordinate of the first detection point 81, and a first height h1. The first height h1 is the Z axis length (i.e., the vertical length) of the detecting pin 28 measured from its lower end 28H to the first point P1. As illustrated in FIG. 4B, the first acquirer 36 moves the detecting pin 28 along the X axis so as to bring the second point P2 of the detecting pin 28 into contact with the first detection point 81. Thus, the first acquirer 36 acquires a second coordinate value $x_{2,0}$ indicative of a second coordinate of the first detection point 81, and a second height h2. The second height h2 is the Z axis length of the detecting pin 28 measured from its lower end 28H to the second point P2. Although the second point P2 is located above the first point P1 in this preferred embodiment, the second point P2 may be located below the first point P1.

Figure 4C:
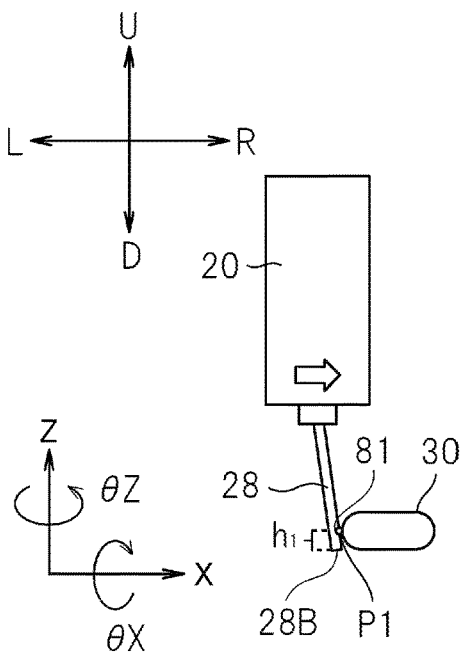
FIG. 4C is a schematic diagram illustrating how the detecting pin that has been rotated by 180 degrees around the Z axis comes into contact with the X reference detection point so as to detect an X coordinate value $x_{1,\,180}$.
Figure 4D:
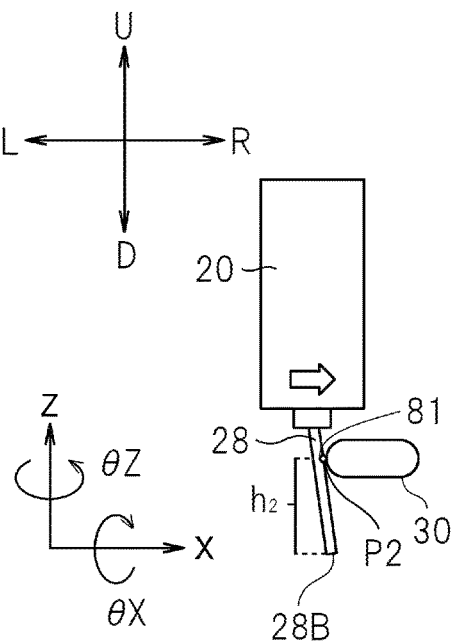
FIG. 4D is a schematic diagram illustrating how the detecting pin that has been rotated by 180 degrees around the Z axis comes into contact with the X reference detection point so as to detect an X coordinate value $x_{2,\,180}$.

As illustrated in FIG. 4C, the second acquirer 38 rotates the detecting pin 28 by 180 degrees around the Z axis. The second acquirer 38 moves the 180-degree rotated detecting pin 28 along the X axis so as to bring the first point P1 of the detecting pin 28 into contact with the first detection point 81. Thus, the second acquirer 38 acquires a third coordinate value $x_{1,180}$ indicative of a third coordinate of the first detection point 81. As illustrated in FIG. 4D, the second acquirer 38 moves the 180-degree rotated detecting pin 28 along the X axis so as to bring the second point P2 of the detecting pin 28 into contact with the first detection point 81.

Thus, the second acquirer 38 acquires a fourth coordinate value $x_{2,\ 180}$ indicative of a fourth coordinate of the first detection point 81.

The first generator 40 generates a first linear equation in accordance with the first coordinate value $x_{1,\ 0}$, the second coordinate value $x_{2,\ 0}$, the third coordinate value $x_{1,\ 180}$, the fourth coordinate value $x_{2,\ 180}$, the first height h1, and the second height h2. The first linear equation includes a third height h as a variable. The third height h is the Z axis length of the detecting pin 28 measured from its lower end 28H to a predetermined point of the detecting pin 28. The first linear equation is given as Eq. (1) as will be described below. The first linear equation is used to correct an X coordinate value.

The X coordinate value at the first height h1 is corrected using a first correction value $x_1$. The first correction value $x_1$ is determined as follows: $x_1 = (x_{1,\ 180} - x_{1,\ 0})/2$. The X coordinate value at the second height h2 is corrected using a second correction value $x_2$. The second correction value $x_2$ is determined as follows: $x_2 = (x_{2,\ 180} - x_{2,\ 0})/2$.

Figure 5:
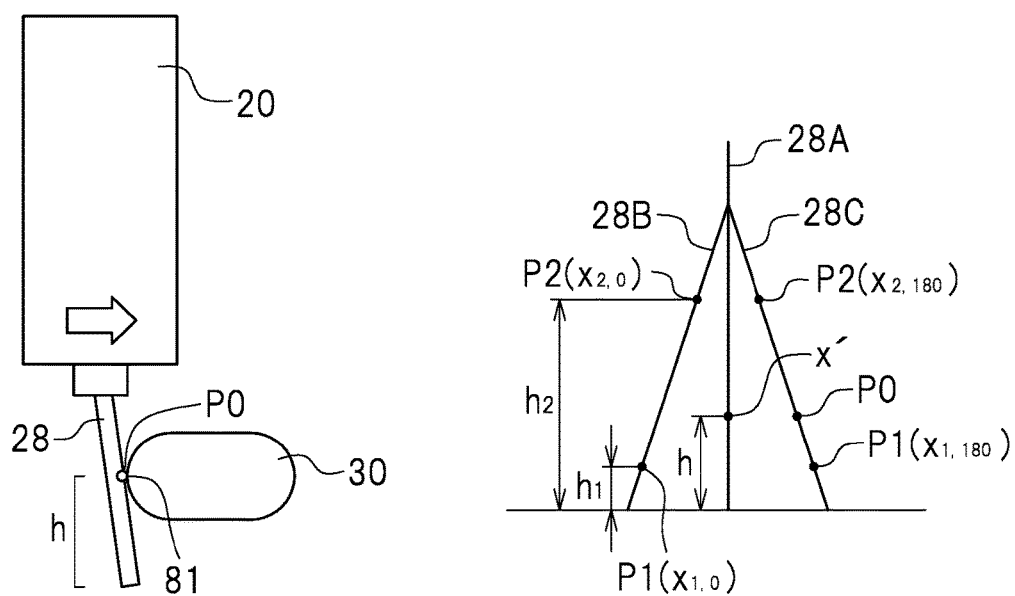
FIG. 5 is a schematic diagram illustrating how a true X coordinate value of a measurement point is acquired.

As illustrated in FIG. 5, the detecting pin 28 preferably further includes a point P0 at the third height h. The third height h is the Z axis length of the detecting pin 28 measured from its lower end 28H to the point P0. The point P0 of the detecting pin 28 is brought into contact with a first measurement point (e.g., the first detection point 81), thus detecting a fifth coordinate value indicative of a coordinate of the first measurement point. The fifth coordinate value detected is corrected using a shaft misalignment correction value $x_{offset}$. The shaft misalignment correction value $x_{offset}$ is given by Eq. (1) below. The fifth coordinate value is an X coordinate value. In FIG. 5, the reference sign 28A represents the detecting pin 28 in alignment, and the reference signs 28B and 28C each represent the detecting pin 28 out of alignment.

$$x_{offset} = \frac{x_2 - x_1}{h_2 - h_1}(h - h_1) + x_1 \quad (1)$$

The detecting pin 28 is moved along the X axis so as to bring the point P0 of the detecting pin 28 into contact with the first measurement point, thus acquiring the fifth coordinate value indicative of the coordinate of the first measurement point. The first corrector 42 corrects the fifth coordinate value using the first linear equation, i.e., Eq. (1). Assuming that the fifth coordinate value is represented as x, an X coordinate value x' obtained by correcting the fifth coordinate value using the first linear equation, i.e., Eq. (1), is given by Eq. (3) below. Note that the X coordinate value x' is the true X coordinate value of the first measurement point.

$$x' = x + x_{offset} = x + \left\{ \frac{x_2 - x_1}{h_2 - h_1}(h - h_1) + x_1 \right\} \quad (3)$$

The Y coordinate value corrector 43 preferably includes a third acquirer 44, a fourth acquirer 46, a second generator 48, and a second corrector 50. The Y coordinate value corrector 43 moves the spindle 20 grasping the detecting pin 28 so as to acquire the coordinate value of the second detection point (or Y reference detection point) 82 on the correction jig 100. As illustrated in FIG. 2, in acquiring the coordinate value of the second detection point 82, the Y coordinate value corrector 43 controls the spindle 20 such that the detecting pin 28 moves along a straight line Y1. The straight line Y1 extends in parallel or substantially parallel with the Y axis and passes through the second detection point 82.

Figure 6A:
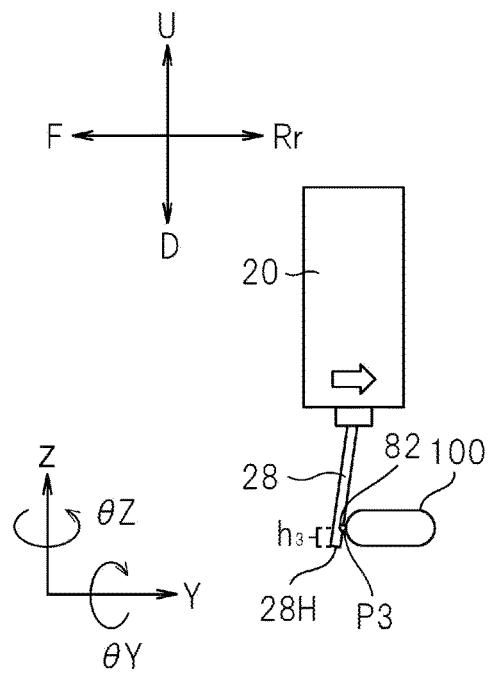
FIG. 6A is a schematic diagram illustrating how the detecting pin comes into contact with a Y reference detection point so as to detect a Y coordinate value $y_{3,\,0}$.
Figure 6B:
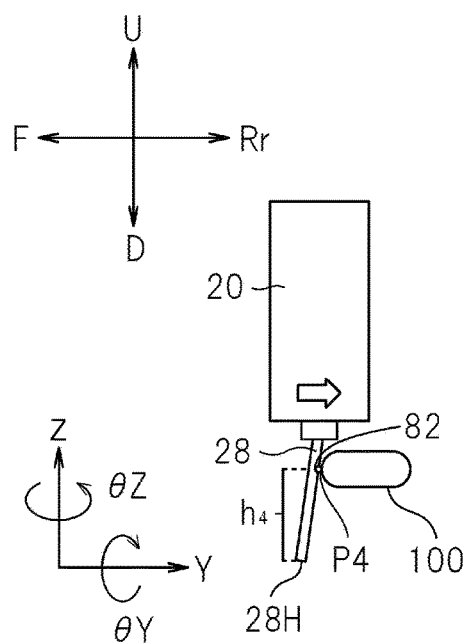
FIG. 6B is a schematic diagram illustrating how the detecting pin comes into contact with the Y reference detection point so as to detect a Y coordinate value $y_{4,\,0}$.

The detecting pin 28 preferably further includes a third point P3 and a fourth point P4 located at different positions along the Z axis. As illustrated in FIG. 6A, the third acquirer 44 moves the detecting pin 28 along the Y axis so as to bring the third point P3 of the detecting pin 28 into contact with the second detection point 82 on the correction jig 100. Thus, the third acquirer 44 acquires a sixth coordinate value $y_{3,\ 0}$ indicative of a first coordinate of the second detection point 82, and a fourth height h3. The fourth height h3 is the Z axis length (i.e., the vertical length) of the detecting pin 28 measured from its lower end 28H to the third point P3. As illustrated in FIG. 6B, the third acquirer 44 moves the detecting pin 28 along the Y axis so as to bring the fourth point P4 of the detecting pin 28 into contact with the second detection point 82. Thus, the third acquirer 44 acquires a seventh coordinate value $y_{4,\ 0}$ indicative of a second coordinate of the second detection point 82, and a fifth height h4. The fifth height h4 is the Z axis length of the detecting pin 28 measured from its lower end 28H to the fourth point P4. Although the fourth point P4 is located above the third point P3 in this preferred embodiment, the fourth point P4 may be located below the third point P3.

Figure 6C:
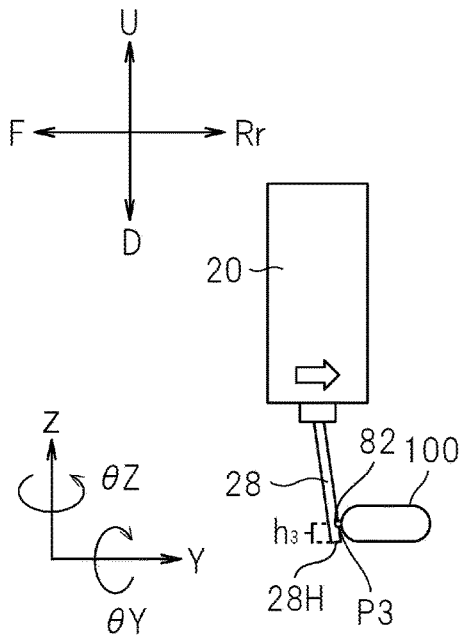
FIG. 6C is a schematic diagram illustrating how the detecting pin that has been rotated by 180 degrees around the Z axis comes into contact with the Y reference detection point so as to detect a Y coordinate value $y_{3,\,180}$.
Figure 6D:
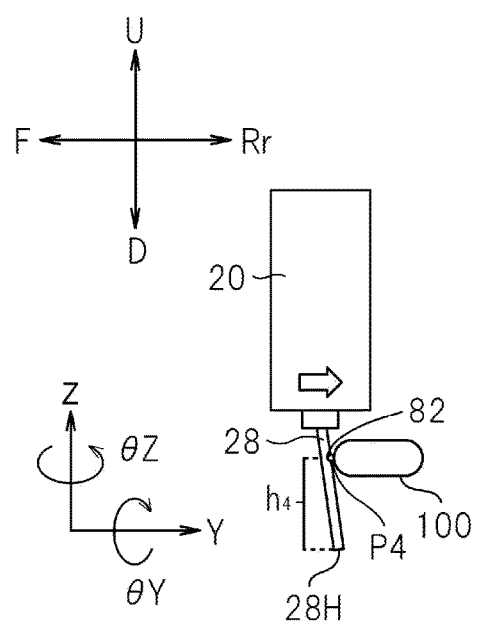
FIG. 6D is a schematic diagram illustrating how the detecting pin that has been rotated by 180 degrees around the Z axis comes into contact with the Y reference detection point so as to detect a Y coordinate value $y_{4,\,180}$.

As illustrated in FIG. 6C, the fourth acquirer 46 rotates the detecting pin 28 by 180 degrees around the Z axis. The fourth acquirer 46 moves the 180-degree rotated detecting pin 28 along the Y axis so as to bring the third point P3 of the detecting pin 28 into contact with the second detection point 82. Thus, the fourth acquirer 46 acquires an eighth coordinate value $y_{3,\ 180}$ indicative of a third coordinate of the second detection point 82. As illustrated in FIG. 6D, the fourth acquirer 46 moves the 180-degree rotated detecting pin 28 along the Y axis so as to bring the fourth point P4 of the detecting pin 28 into contact with the second detection point 82. Thus, the fourth acquirer 46 acquires a ninth coordinate value $y_{4,\ 180}$ indicative of a fourth coordinate of the second detection point 82.

The second generator 48 generates a second linear equation in accordance with the sixth coordinate value $y_{3,\ 0}$, the seventh coordinate value $y_{4,\ 0}$, the eighth coordinate value $y_{3,\ 180}$, the ninth coordinate value $y_{4,\ 180}$, the fourth height h3, and the fifth height h4. The second linear equation includes the third height h as a variable. The third height h is the Z axis length of the detecting pin 28 measured from its lower end 28H to a predetermined point of the detecting pin 28. The second linear equation is given as Eq. (2) as will be described below. The second linear equation is used to correct a Y coordinate value.

The Y coordinate value at the fourth height h3 is corrected using a third correction value $y_3$. The third correction value $y_3$ is determined as follows: $y_3 = (y_{3,\ 180} - y_{3,\ 0})/2$. The Y coordinate value at the fifth height h4 is corrected using a fourth correction value $y_4$. The fourth correction value $y_4$ is determined as follows: $y_4 = (y_{4,\ 0} - y_{4,\ 180})/2$.

Figure 7:
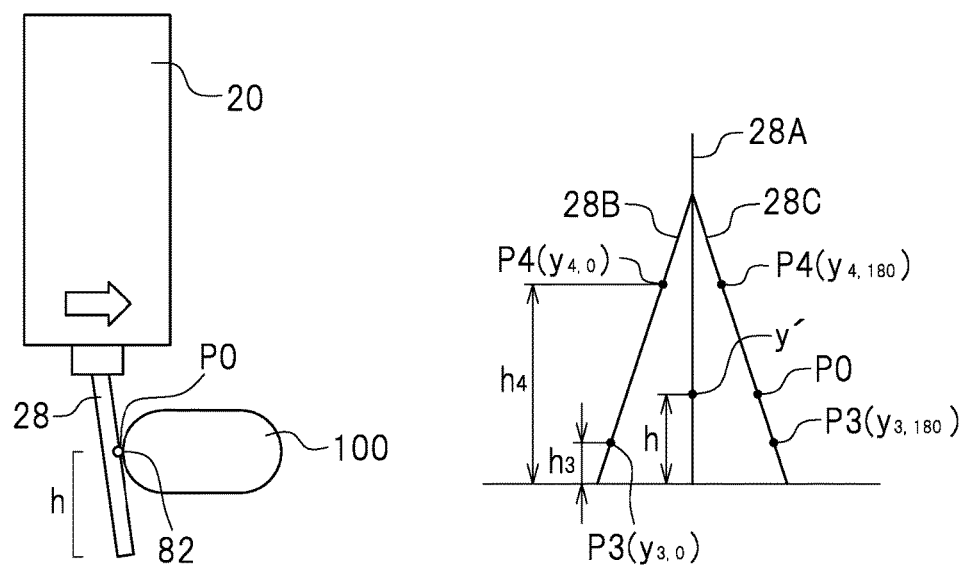
FIG. 7 is a schematic diagram illustrating how a true Y coordinate value of a measurement point is acquired.

As illustrated in FIG. 7, the detecting pin 28 preferably includes the point P0 at the third height h. The third height h is the Z axis length of the detecting pin 28 measured from its lower end 28H to the point P0. The point P0 of the detecting pin 28 is brought into contact with a second measurement point (e.g., the second detection point 82), thus detecting a tenth coordinate value indicative of a coordinate of the second measurement point. The tenth coordinate value detected is corrected using a shaft misalignment correction value $y_{offset}$. The shaft misalignment correction value $y_{offset}$ is given by Eq. (2) below. The tenth coordinate value is a Y coordinate value. In FIG. 7, the reference sign 28A represents the detecting pin 28 in alignment, and the reference signs 28B and 28C each represent the detecting pin 28 out of alignment.

$$y_{offset} = \frac{y_4 - y_3}{h_4 - h_3}(h - h_3) + y_3 \quad (2)$$

The detecting pin 28 is moved along the Y axis such that the point P0 of the detecting pin 28 comes into contact with the second measurement point, thus acquiring the tenth coordinate value indicative of the coordinate of the second measurement point. The second corrector 50 corrects the tenth coordinate value using the second linear equation, i.e., Eq. (2). Assuming that the tenth coordinate value is represented as y, a Y coordinate value y' obtained by correcting the tenth coordinate value using the second linear equation, i.e., Eq. (2), is given by Eq. (4) below. Note that the Y coordinate value y' is the true Y coordinate value of the second measurement point.

$$y' = y + y_{offset} = y + \left\{\frac{y_4 - y_3}{h_4 - h_3}(h - h_3) + y_3\right\} \quad (4)$$

The positioner 52 determines the relative positions of the spindle 20, the work holder 16, and the magazine 30 in accordance with the fifth coordinate value corrected using the first linear equation, i.e., Eq. (1), and the tenth coordinate value corrected using the second linear equation, i.e., Eq. (2). The positioner 52 calculates a positioning correction value from the fifth coordinate value corrected, the tenth coordinate value corrected, and the coordinate values of the first and second measurement points stored in the memory 34. The positioner 52 then effects positioning of target components (such as the spindle 20, the work holder 16, and the magazine 30) using the positioning correction value calculated. The details of how the positioning correction value is specifically calculated and how positioning of the target components is effected using the positioning correction value will be omitted because known techniques may be used for these purposes.

The following description discusses a shaft misalignment correction value calculating process and a positioning process to be carried out by the above-described machining apparatus 10 at a predetermined time, such as at the time of shipment from a factory or parts replacement. The shaft misalignment correction value calculating process calculates a shaft misalignment correction value to correct a coordinate value detected by the detecting pin 28 mounted on the spindle 20. The shaft misalignment correction value calculating process involves detecting reference detection points (which are the first detection point 81 and the second detection point 82 in this preferred embodiment). The positioning process aims at effecting positioning of target components. The positioning process involves detecting measurement points (which are the first detection point 81 and the second detection point 82 in this preferred embodiment).

Figure 8:
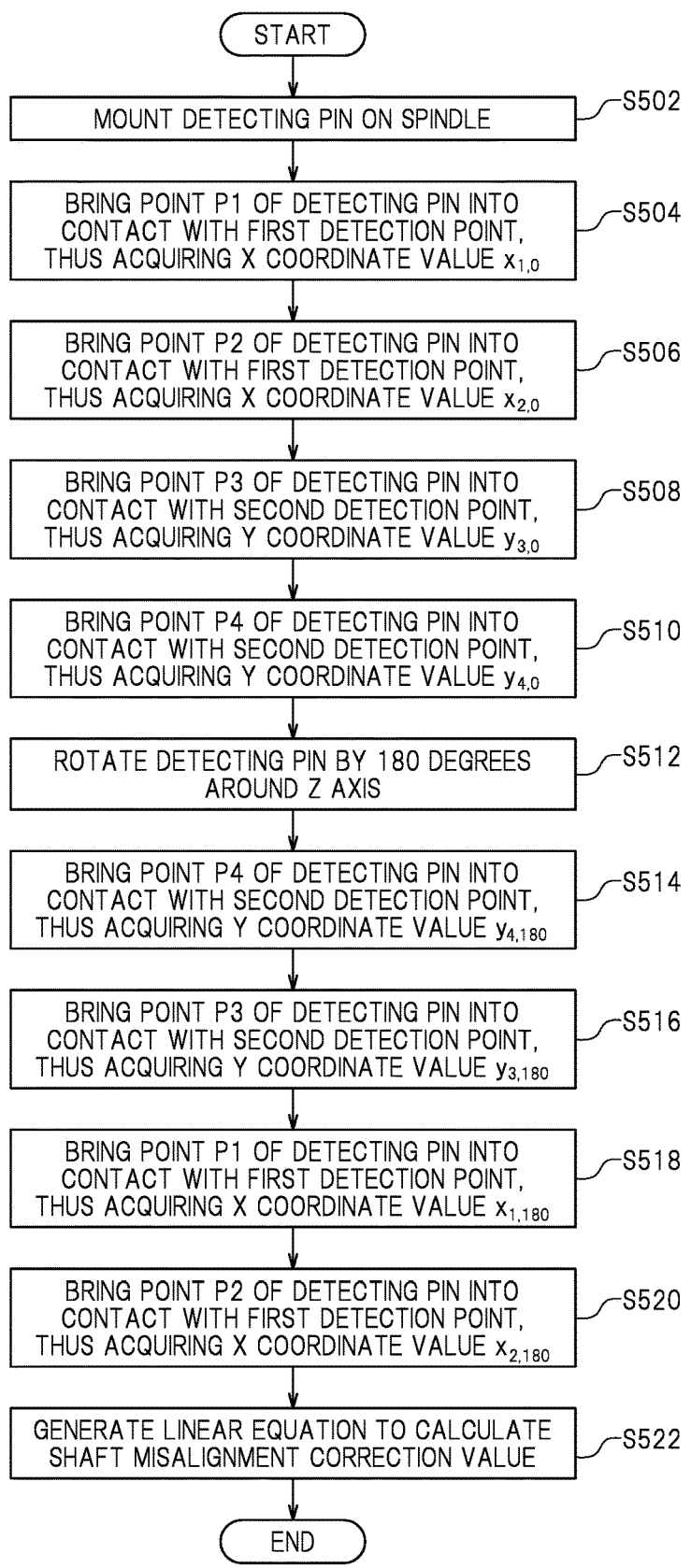
FIG. 8 is a flow chart illustrating the procedure of a shaft misalignment correction value calculating process.

First, the correction jig 100 is held by the rotary member 24 of the work holder 16 as illustrated in FIG. 2 and then an operating element (not illustrated) is operated so as to start the positioning process. This prompts the microcomputer 18 to start the shaft misalignment correction value calculating process. FIG. 8 is a flow chart illustrating the procedure of the shaft misalignment correction value calculating process.

In step S502, one of the detecting pins 28 contained in the magazine 30 is mounted on the spindle 20.

In step S504, the spindle 20 is moved along the X axis, with the first point P1 of the detecting pin 28 located on the straight line X1. The straight line X1 extends in parallel or substantially parallel with the X axis and passes through the first detection point 81 serving as an X reference detection point. The first acquirer 36 brings the first point P1 of the detecting pin 28 into contact with the first detection point 81 so as to acquire the X coordinate value (first coordinate value) $x_{1, 0}$. The first acquirer 36 also acquires the first height h1. The first height h1 is the Z axis length (i.e., the vertical length) of the detecting pin 28 measured from its lower end 28H to the first point P1.

In step S506, the spindle 20 is moved along the X axis, with the second point P2 of the detecting pin 28 located on the straight line X1. The first acquirer 36 brings the second point P2 of the detecting pin 28 into contact with the first detection point 81 so as to acquire the X coordinate value (second coordinate value) $x_{2, 0}$. The first acquirer 36 also acquires the second height h2. The second height h2 is the Z axis length (i.e., the vertical length) of the detecting pin 28 measured from its lower end 28H to the second point P2.

In step S508, the spindle 20 is moved along the Y axis, with the third point P3 of the detecting pin 28 located on the straight line Y1. The straight line Y1 extends in parallel or substantially parallel with the Y axis and passes through the second detection point 82 serving as a Y reference detection point. The third acquirer 44 brings the third point P3 of the detecting pin 28 into contact with the second detection point 82 so as to acquire the Y coordinate value (sixth coordinate value) $y_{3, 0}$. The third acquirer 44 also acquires the fourth height h3. The fourth height h3 is the Z axis length (i.e., the vertical length) of the detecting pin 28 measured from its lower end 28H to the third point P3.

In step S510, the spindle 20 is moved along the Y axis, with the fourth point P4 of the detecting pin 28 located on the straight line Y1. The third acquirer 44 brings the fourth point P4 of the detecting pin 28 into contact with the second detection point 82 so as to acquire the Y coordinate value (seventh coordinate value) $y_{4, 0}$. The third acquirer 44 also acquires the fifth height h4. The fifth height h4 is the Z axis length (i.e., the vertical length) of the detecting pin 28 measured from its lower end 28H to the fourth point P4.

In step S512, the spindle 20 is rotated so as to rotate the detecting pin 28 by 180 degrees around the Z axis.

In step S514, the spindle 20 is moved along the Y axis, with the fourth point P4 of the 180-degree rotated detecting pin 28 located on the straight line Y1. The fourth acquirer 46 brings the fourth point P4 of the detecting pin 28 into contact with the second detection point 82 so as to acquire the Y coordinate value (ninth coordinate value) $y_{4, 180}$.

In step S516, the spindle 20 is moved along the Y axis, with the third point P3 of the 180-degree rotated detecting pin 28 located on the straight line Y1. The fourth acquirer 46 brings the third point P3 of the detecting pin 28 into contact with the second detection point 82 so as to acquire the Y coordinate value (eighth coordinate value) $y_{3, 180}$.

In step S518, the spindle 20 is moved along the X axis, with the first point P1 of the 180-degree rotated detecting pin 28 located on the straight line X1. The second acquirer 38 brings the first point P1 of the detecting pin 28 into contact with the first detection point 81 so as to acquire the X coordinate value (third coordinate value) $x_{1, 180}$.

In step S520, the spindle 20 is moved along the X axis, with the second point P2 of the 180-degree rotated detecting pin 28 located on the straight line X1. The second acquirer 38 brings the second point P2 of the detecting pin 28 into contact with the first detection point 81 so as to acquire the X coordinate value (fourth coordinate value) $x_{2,\,180}$.

In step S522, the first generator 40 generates the first linear equation, i.e., Eq. (1), in accordance with the X coordinate value (first coordinate value) $x_{1,\,0}$, the X coordinate value (second coordinate value) $x_{2,\,0}$, the X coordinate value (third coordinate value) $x_{1,\,180}$, the X coordinate value (fourth coordinate value) $x_{2,\,180}$, the first height h1, and the second height h2. The first linear equation, i.e., Eq. (1), is used to calculate the shaft misalignment correction value $x_{offset}$. The second generator 48 generates the second linear equation, i.e., Eq. (2), in accordance with the Y coordinate value (sixth coordinate value) $y_{3,\,0}$, the Y coordinate value (seventh coordinate value) $y_{4,\,0}$, the Y coordinate value (eighth coordinate value) $y_{3,\,180}$, the Y coordinate value (ninth coordinate value) $y_{4,\,180}$, the fourth height h3, and the fifth height h4. The second linear equation, i.e., Eq. (2), is used to calculate the shaft misalignment correction value $y_{offset}$. Upon completion of step S522, the shaft misalignment correction value calculating process comes to an end.

Figure 9:
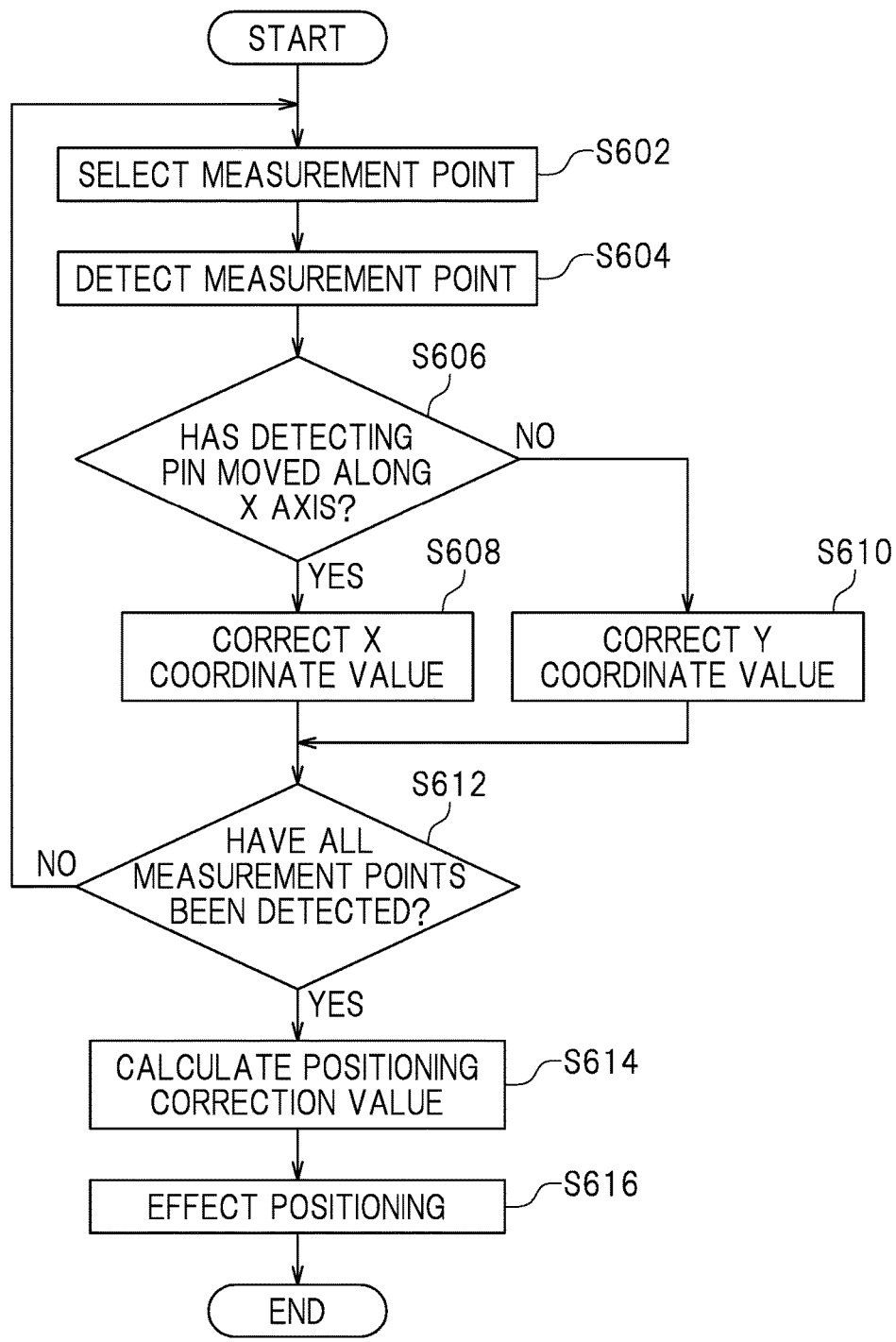
FIG. 9 is a flow chart illustrating the procedure of a positioning process.

Once the first linear equation, i.e., Eq. (1), and the second linear equation, i.e., Eq. (2), have been generated in the shaft misalignment correction value calculating process, the positioning process starts. FIG. 9 is a flow chart illustrating the procedure of the positioning process.

In step S602, a yet-to-be-detected measurement point is selected from those on the correction jig 100 and the magazine 30. In the present preferred embodiment, the measurement points on the correction jig 100 are four in number, and the measurement points on the magazine 30 are three in number, for example.

In step S604, the coordinate value of the measurement point selected is detected. Specifically, the detecting pin 28 is moved along the X axis or the Y axis so as to bring the point P0 of the detecting pin 28 into contact with the measurement point selected, thus acquiring the coordinate value of the measurement point selected. In step S604, the height h is also acquired. The height h is the Z axis length (i.e., the vertical length) of the detecting pin 28 measured from its lower end 28H to the point P0.

In step S606, a determination is made whether the detecting pin 28 has been moved along the X axis. When the determination indicates that the detecting pin 28 has been moved along the X axis, the process goes to step S608. When the determination indicates that the detecting pin 28 has been moved along the Y axis, the process goes to step S610.

In step S608, the shaft misalignment correction value $x_{offset}$, which has been calculated by the shaft misalignment correction value calculating process, is used to correct the X coordinate value acquired by detecting the measurement point. In other words, Eq. (3) previously described is used to correct the X coordinate value, thus acquiring a true X coordinate value.

In step S610, the shaft misalignment correction value $y_{offset}$, which has been calculated by the shaft misalignment correction value calculating process, is used to correct the Y coordinate value acquired by detecting the measurement point. In other words, Eq. (4) previously described is used to correct the Y coordinate value, thus acquiring a true Y coordinate value.

In step S612, a determination is made whether all the measurement points have been detected. When the determination indicates that not all the measurement points have been detected, the process returns to step S602. When the determination indicates that all the measurement points have been detected, the process goes to step S614.

In step S614, a positioning correction value is calculated using the coordinate values obtained by correcting shaft misalignment (i.e., the true X coordinate value acquired in step S608 and the true Y coordinate value acquired in step S610).

In step S616, positioning of the target components (e.g., the spindle 20, the work holder 16, and the magazine 30) is effected using the positioning correction value calculated. Upon completion of step S616, the positioning process comes to an end.

As described above, the machining apparatus 10 configured to perform the correcting method according to the present preferred embodiment corrects a coordinate value detected by the detecting pin 28 mounted on the spindle 20. To achieve this purpose, the machining apparatus 10 operates as follows. The machining apparatus 10 sequentially brings the two points of the detecting pin 28 different in height into contact with a predetermined X reference detection point (e.g., the first detection point 81) on the magazine 30 so as to acquire X coordinate values. The machining apparatus 10 sequentially brings the two points of the detecting pin 28 different in height into contact with a predetermined Y reference detection point (e.g., the second detection point 82) on the correction jig 100 so as to acquire Y coordinate values.

The machining apparatus 10 rotates the detecting pin 28 by 180 degrees around the Z axis. The machining apparatus 10 sequentially brings the two points of the 180-degree rotated detecting pin 28 into contact with the predetermined X reference detection point (e.g., the first detection point 81) so as to acquire X coordinate values. The machining apparatus 10 sequentially brings the two points of the 180-degree rotated detecting pin 28 into contact with the predetermined Y reference detection point (e.g., the second detection point 82) so as to acquire Y coordinate values.

Using the four X coordinate values acquired and the Z axis heights of the detecting pin 28 measured from its lower end to the two points, the machining apparatus 10 generates Eq. (1) previously described. Eq. (1) serves as a linear equation to calculate a shaft misalignment correction value for the X coordinate values. Using the four Y coordinate values acquired and the Z axis heights of the detecting pin 28 measured from its lower end to the two points, the machining apparatus 10 generates Eq. (2) previously described. Eq. (2) serves as a linear equation to calculate a shaft misalignment correction value for the Y coordinate values.

Following the detection of measurement points used for positioning, the coordinate values of the measurement points detected by the detecting pin 28 are corrected using Eq. (3) generated on the basis of Eq. (1) and Eq. (4) generated on the basis of Eq. (2).

Thus, the machining apparatus 10 configured to perform the correcting method according to this preferred embodiment enables the coordinate values of the measurement points detected by the detecting pin 28 to be corrected more properly than before. This advantage enables calculation of a more proper positioning correction value if the detecting pin 28 mounted on the spindle 20 is out of alignment therewith. Consequently, the machining apparatus 10 according to this preferred embodiment effects proper positioning of the target components. The machining apparatus 10 uses the result of the position correction to adjust the position of the target components.

The shaft misalignment correction value calculating process according to the above preferred embodiment includes: acquiring the X coordinate value (first coordinate value) $x_{1, 0}$, the X coordinate value (second coordinate value) $x_{2, 0}$, the Y coordinate value (sixth coordinate value) $y_{3, 0}$, and the Y coordinate value (seventh coordinate value) $y_{4, 0}$ in this order; and rotating the detecting pin 28 by 180 degrees and then acquiring the Y coordinate value (ninth coordinate value) $y_{4, 180}$, the Y coordinate value (eighth coordinate value) $y_{3, 180}$, the X coordinate value (third coordinate value) $x_{1, 180}$, and the X coordinate value (fourth coordinate value) $x_{2, 180}$ in this order. The shaft misalignment correction value calculating process, however, is not limited to this preferred embodiment. The shaft misalignment correction value calculating process may include acquiring the X and Y coordinate values in any other order.

For example, the work 200 to be machined by the machining apparatus 10 according to the above preferred embodiment may be a dental ceramic article. In such a case, the machining apparatus 10 may be utilized as an artificial tooth machining apparatus configured to machine the dental ceramic article into a desired shape.

The positioning process according to the above preferred embodiment includes, after measurement point detection, determining whether the detecting pin 28 has been moved along the X axis during the measurement point detection. The positioning process, however, is not limited to this preferred embodiment. The positioning process according to an alternative preferred embodiment of the present invention may include: associating a measurement point stored in the memory 34 with information indicative of whether the detecting pin 28 moves along the X axis during detection of the measurement point; storing the resulting measurement point in the memory 34; and determining, upon selection of the measurement point (i.e., prior to detection of the measurement point), whether the detecting pin 28 moves along the X axis during the detection of the measurement point selected. When the determination indicates that the detecting pin 28 moves along the X axis, the positioning process according to this alternative preferred embodiment may further include, after the measurement point has been detected and the coordinate value of the measurement point has been acquired, correcting the coordinate value using Eq. (3), thus acquiring a true X coordinate value. When the determination indicates that the detecting pin 28 moves along the Y axis, the positioning process according to this alternative preferred embodiment may further include, after the measurement point has been detected and the coordinate value of the measurement point has been acquired, correcting the coordinate value using Eq. (4), thus acquiring a true Y coordinate value.

In the above preferred embodiment, the first detection point 81 is provided on the magazine 30. Alternatively, the first detection point 81 may be provided on the correction jig 100 or the work holder 16. In the above preferred embodiment, the second detection point 82 is provided on the correction jig 100. Alternatively, the second detection point 82 may be provided on the magazine 30 or the work holder 16.

In the above preferred embodiment, the first measurement point is identical to the first detection point 81. Alternatively, the first measurement point may be different from the first detection point 81. In the above preferred embodiment, the second measurement point is identical to the second detection point 82. Alternatively, the second measurement point may be different from the second detection point 82.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A correcting apparatus comprising:
   a spindle rotatable around a Z axis of an X, Y and Z orthogonal coordinate system;
   a detecting pin detachably mounted on the spindle, the detecting pin including a first point and a second point located at different positions along the Z axis;
   a first detection point capable of contacting the detecting pin;
   a first measurement point capable of contacting the detecting pin;
   a microcomputer configured or programmed to:
      move the detecting pin along an X axis of the X, Y and Z orthogonal coordinate system to bring the first point of the detecting pin into contact with the first detection point, to acquire a first coordinate value indicative of a first coordinate of the first detection point and to acquire a first height, the first height being a Z axis length of the detecting pin measured from a lower end of the detecting pin to the first point, and move the detecting pin along the X axis to bring the second point of the detecting pin into contact with the first detection point, to acquire a second coordinate value indicative of a second coordinate of the first detection point and acquire a second height, the second height being a Z axis length of the detecting pin measured from the lower end of the detecting pin to the second point;
      rotate the detecting pin by 180 degrees around the Z axis, to move the 180-degree rotated detecting pin along the X axis to bring the first point of the detecting pin into contact with the first detection point, to acquire a third coordinate value indicative of a third coordinate of the first detection point, and move the 180-degree rotated detecting pin along the X axis to bring the second point of the detecting pin into contact with the first detection point, to acquire a fourth coordinate value indicative of a fourth coordinate of the first detection point;
      generate a first linear equation in accordance with the first coordinate value, the second coordinate value, the third coordinate value, the fourth coordinate value, the first height, and the second height, the first linear equation including a third height as a variable, the third height being a Z axis length of the detecting pin measured from the lower end of the detecting pin to a predetermined point of the detecting pin; and
      correct a fifth coordinate value indicative of a coordinate of the first measurement point using the first linear equation, the fifth coordinate value being obtained by bringing the predetermined point of the detecting pin into contact with the first measurement point.

2. The correcting apparatus according to claim 1, wherein the microcomputer is configured or programmed to include:
   a first acquirer configured or programmed to move the detecting pin along the X axis of the X, Y and Z orthogonal coordinate system to bring the first point of the detecting pin into contact with the first detection point, to acquire the first coordinate value indicative of the first coordinate of the first detection point and to acquire the first height, and move the detecting pin along the X axis to bring the second point of the detecting pin into contact with the first detection point, to acquire the second coordinate value indicative of the second coordinate of the first detection point and acquire the second height;

a second acquirer configured or programmed to rotate the detecting pin by 180 degrees around the Z axis, to move the 180-degree rotated detecting pin along the X axis to bring the first point of the detecting pin into contact with the first detection point, to acquire the third coordinate value indicative of the third coordinate of the first detection point, and move the 180-degree rotated detecting pin along the X axis to bring the second point of the detecting pin into contact with the first detection point, to acquire the fourth coordinate value indicative of the fourth coordinate of the first detection point;

a first generator configured or programmed to generate the first linear equation in accordance with the first coordinate value, the second coordinate value, the third coordinate value, the fourth coordinate value, the first height, and the second height, the first linear equation including the third height as the variable; and a first corrector configured or programmed to correct the fifth coordinate value indicative of the coordinate of the first measurement point using the first linear equation, the fifth coordinate value being obtained by bringing the predetermined point of the detecting pin into contact with the first measurement point.

3. The correcting apparatus according to claim 1, further comprising:

a second detection point capable of contacting the detecting pin, the detecting pin further including a third point and a fourth point located at different positions along the Z axis; and a second measurement point capable of contacting the detecting pin; wherein the microcomputer is configured or programmed to:

move the detecting pin along a Y axis of the X, Y and Z orthogonal coordinate system to bring the third point of the detecting pin into contact with the second detection point, to acquire a sixth coordinate value indicative of a first coordinate of the second detection point and acquire a fourth height, the fourth height being a Z axis length of the detecting pin measured from the lower end of the detecting pin to the third point, and move the detecting pin along the Y axis to bring the fourth point of the detecting pin into contact with the second detection point, to acquire a seventh coordinate value indicative of a second coordinate of the second detection point and acquire a fifth height, the fifth height being a Z axis length of the detecting pin measured from the lower end of the detecting pin to the fourth point;

rotate the detecting pin by 180 degrees around the Z axis, to move the 180-degree rotated detecting pin along the Y axis to bring the third point of the detecting pin into contact with the second detection point, to acquire an eighth coordinate value indicative of a third coordinate of the second detection point, and move the 180-degree rotated detecting pin along the Y axis to bring the fourth point of the detecting pin into contact with the second detection point, to acquire a ninth coordinate value indicative of a fourth coordinate of the second detection point;

generate a second linear equation in accordance with the sixth coordinate value, the seventh coordinate value, the eighth coordinate value, the ninth coordinate value, the fourth height, and the fifth height, the second linear equation including the third height as a variable; and correct a tenth coordinate value indicative of a coordinate of the second measurement point using the second linear equation, the tenth coordinate value being obtained by bringing the predetermined point of the detecting pin into contact with the second measurement point.

4. The correcting apparatus according to claim 3, wherein the microcomputer is configured or programmed to include:

a third acquirer configured or programmed to move the detecting pin along the Y axis of the X, Y and Z orthogonal coordinate system to bring the third point of the detecting pin into contact with the second detection point, to acquire the sixth coordinate value indicative of the first coordinate of the second detection point and acquire the fourth height, and move the detecting pin along the Y axis to bring the fourth point of the detecting pin into contact with the second detection point, to acquire the seventh coordinate value indicative of the second coordinate of the second detection point and acquire the fifth height;

a fourth acquirer configured or programmed to rotate the detecting pin by 180 degrees around the Z axis, to move the 180-degree rotated detecting pin along the Y axis to bring the third point of the detecting pin into contact with the second detection point, to acquire the eighth coordinate value indicative of the third coordinate of the second detection point, and move the 180-degree rotated detecting pin along the Y axis to bring the fourth point of the detecting pin into contact with the second detection point, to acquire the ninth coordinate value indicative of the fourth coordinate of the second detection point;

a second generator configured or programmed to generate the second linear equation in accordance with the sixth coordinate value, the seventh coordinate value, the eighth coordinate value, the ninth coordinate value, the fourth height, and the fifth height, the second linear equation including the third height as a variable; and a second corrector configured or programmed to correct the tenth coordinate value indicative of the coordinate of the second measurement point using the second linear equation, the tenth coordinate value being obtained by bringing the predetermined point of the detecting pin into contact with the second measurement point.

5. The correcting apparatus according to claim 3, wherein a first correction value $x_1$ at the first height is expressed as follows:

$$x_1 = (x_{1,180} - x_{1,0})/2$$

where the first coordinate value is $x_{1,0}$, and the third coordinate value is $x_{1,180}$, a second correction value $x_2$ at the second height is expressed as follows:

$$x_2 = (x_{2,180} - x_{2,0})/2$$

where the second coordinate value is $x_{2,0}$, and the fourth coordinate value is $x_{2,180}$, the first linear equation is expressed as Equation 1 below:

$$x_{offset} = \frac{x_2 - x_1}{h_2 - h_1}(h - h_1) + x_1 \quad (1)$$

where the first height is $h_1$, the second height is $h_2$, the fifth coordinate value is x, the third height is h, and a correction value to correct the fifth coordinate value x is $x_{offset}$,
a third correction value $y_3$ at the fourth height is expressed as follows:

$$y_3 = (y_{3,180} - y_{3,0})/2$$

where the sixth coordinate value is $y_{3,\ 0}$, and the eighth coordinate value is $y_{3,\ 180}$,
a fourth correction value $y_4$ at the fifth height is expressed as follows:

$$y_4 = (y_{4,0} - y_{4,180})/2$$

where the seventh coordinate value is $y_{4,\ 0}$, and the ninth coordinate value is $y_{4,\ 180}$, and
the second linear equation is expressed as Equation 2 below:

$$y_{offset} = \frac{y_4 - y_3}{h_4 - h_3}(h - h_3) + y_3 \quad (2)$$

where the fourth height is $h_3$, the fifth height is $h_4$, the tenth coordinate value is y, the third height is h, and a correction value to correct the tenth coordinate value y is $y_{offset}$.

6. The correcting apparatus according to claim 3, further comprising:
a tool to be detachably mounted on the spindle to machine a work;
a holder to hold one of the work and a jig, the jig including the second detection point and the second measurement point; and
a container to contain at least one of the detecting pin and the tool, the container including the first detection point and the first measurement point, the container being fixed to the holder.

7. The correcting apparatus according to claim 6, wherein the microcomputer is configured or programmed to determine relative positions of the spindle, the holder, and the container in accordance with the fifth coordinate value corrected using the first linear equation and the tenth coordinate value corrected using the second linear equation.

8. A coordinate value correcting method for causing a correcting apparatus to:
move a detecting pin along an X axis of an X, Y and Z orthogonal coordinate system to bring a first point of the detecting pin into contact with a first detection point, and acquire a first coordinate value indicative of a first coordinate of the first detection point and acquiring a first height, the first height being a Z axis length of the detecting pin measured from a lower end of the detecting pin to the first point; and
move the detecting pin along the X axis to bring a second point of the detecting pin into contact with the first detection point, and acquire a second coordinate value indicative of a second coordinate of the first detection point and acquiring a second height, the second height being a Z axis length of the detecting pin measured from the lower end of the detecting pin to the second point;
rotate the detecting pin by 180 degrees around the Z axis;
move the 180-degree rotated detecting pin along the X axis to bring the first point of the detecting pin into contact with the first detection point, acquire a third coordinate value indicative of a third coordinate of the first detection point, and acquire a fourth coordinate value indicative of a fourth coordinate of the first detection point; and
generate a first linear equation in accordance with the first coordinate value, the second coordinate value, the third coordinate value, the fourth coordinate value, the first height, and the second height, the first linear equation including a third height as a variable, the third height being a Z axis length of the detecting pin measured from the lower end of the detecting pin to a predetermined point of the detecting pin; and
correct a fifth coordinate value indicative of a coordinate of the first measurement point using the first linear equation, the fifth coordinate value being obtained by bringing the predetermined point of the detecting pin into contact with the first measurement point.

9. The correcting method according to claim 8, wherein the correcting method further causes the correcting apparatus to:
move the detecting pin along a Y axis of the X, Y and Z orthogonal coordinate system to bring a third point of the detecting pin into contact with the second detection point, and acquire a sixth coordinate value indicative of a first coordinate of the second detection point and acquiring a fourth height, the fourth height being a Z axis length of the detecting pin measured from the lower end of the detecting pin to the third point; and
move the detecting pin along the Y axis so as to bring a fourth point of the detecting pin into contact with the second detection point, and acquire a seventh coordinate value indicative of a second coordinate of the second detection point and acquiring a fifth height, the fifth height being a Z axis length of the detecting pin measured from the lower end of the detecting pin to the fourth point;
rotate the detecting pin by 180 degrees around the Z axis;
move the 180-degree rotated detecting pin along the Y axis to bring the third point of the detecting pin into contact with the second detection point, and acquire an eighth coordinate value indicative of a third coordinate of the second detection point; and
move the 180-degree rotated detecting pin along the Y axis to bring the fourth point of the detecting pin into contact with the second detection point, and acquire a ninth coordinate value indicative of a fourth coordinate of the second detection point;
generate a second linear equation in accordance with the sixth coordinate value, the seventh coordinate value, the eighth coordinate value, the ninth coordinate value, the fourth height, and the fifth height, the second linear equation including the third height as a variable; and
correct a tenth coordinate value indicative of a coordinate of the second measurement point using the second linear equation, the tenth coordinate value being obtained by bringing the predetermined point of the detecting pin into contact with the second measurement point.

10. The correcting method according to claim 9, wherein a first correction value $x_1$ at the first height is expressed as follows:

$$x_1 = (x_{1,180} - x_{1,0})/2$$

where the first coordinate value is $x_{1,\,0}$, and the third coordinate value is $x_{1,\,180}$, a second correction value $x_2$ at the second height is expressed as follows:

$$x_2 = (x_{2,180} - x_{2,0})/2$$

where the second coordinate value is $x_{2,\,0}$, and the fourth coordinate value is $x_{2,\,180}$, the first linear equation is expressed as Equation 1 below:

$$x_{offset} = \frac{x_2 - x_1}{h_2 - h_1}(h - h_1) + x_1 \quad (1)$$

where the first height is $h_1$, the second height is $h_2$, the fifth coordinate value is $x$, the third height is $h$, and a correction value to correct the fifth coordinate value $x$ is $x_{offset}$, a third correction value $y_3$ at the fourth height is expressed as follows:

$$y_3 = (y_{3,180} - y_{3,0})/2$$

where the sixth coordinate value is $y_{3,\,0}$, and the eighth coordinate value is $y_{3,\,180}$, a fourth correction value $y_4$ at the fifth height is expressed as follows:

$$y_4 = (y_{4,0} - y_{4,180})/2$$

where the seventh coordinate value is $y_{4,\,0}$, and the ninth coordinate value is $y_{4,\,180}$, and the second linear equation is expressed as Equation 2 below:

$$y_{offset} = \frac{y_4 - y_3}{h_4 - h_3}(h - h_3) + y_3 \quad (2)$$

where the fourth height is $h_3$, the fifth height is $h_4$, the tenth where the fourth height is $h_3$, the fifth height is $h_4$, the tenth coordinate value is $y$, the third height is $h$, and a correction value to correct the tenth coordinate value $y$ is $y_{offset}$.

11. The correcting method according to claim 9, wherein the correcting method further causes the correcting apparatus to:

determine relative positions of a spindle, a holder, and a container in accordance with the fifth coordinate value corrected using the first linear equation and the tenth coordinate value corrected using the second linear equation.

12. A non-transitory computer-readable storage medium storing a computer program for use with a correcting apparatus, the computer program causing a microcomputer of the correcting apparatus to:

move a detecting pin along an X axis of an X, Y and Z orthogonal coordinate system to bring a first point of the detecting pin into contact with a first detection point, and acquire a first coordinate value indicative of a first coordinate of the first detection point and acquire a first height, the first height being a Z axis length of the detecting pin measured from a lower end of the detecting pin to the first point;

move the detecting pin along the X axis to bring a second point of the detecting pin into contact with the first detection point, and acquire a second coordinate value indicative of a second coordinate of the first detection point and acquire a second height, the second height being a Z axis length of the detecting pin measured from the lower end of the detecting pin to the second point;

rotate the detecting pin by 180 degrees around the Z axis;

move the 180-degree rotated detecting pin along the X axis to bring the first point of the detecting pin into contact with the first detection point, acquire a third coordinate value indicative of a third coordinate of the first detection point, and acquire a fourth coordinate value indicative of a fourth coordinate of the first detection point; and generate a first linear equation in accordance with the first coordinate value, the second coordinate value, the third coordinate value, the fourth coordinate value, the first height, and the second height, the first linear equation including a third height as a variable, the third height being a Z axis length of the detecting pin measured from the lower end of the detecting pin to a predetermined point of the detecting pin; and correct a fifth coordinate value indicative of a coordinate of the first measurement point using the first linear equation, the fifth coordinate value being obtained by bringing the predetermined point of the detecting pin into contact with the first measurement point.

13. The non-transitory computer-readable storage medium according to claim 12, wherein the computer program further causes the computer to:

move the detecting pin along a Y axis of the X, Y and Z orthogonal coordinate system to bring a third point of the detecting pin into contact with the second detection point, and acquire a sixth coordinate value indicative of a first coordinate of the second detection point and acquire a fourth height, the fourth height being a Z axis length of the detecting pin measured from the lower end of the detecting pin to the third point;

move the detecting pin along the Y axis so as to bring a fourth point of the detecting pin into contact with the second detection point, and acquire a seventh coordinate value indicative of a second coordinate of the second detection point and acquiring a fifth height, the fifth height being a Z axis length of the detecting pin measured from the lower end of the detecting pin to the fourth point;

rotate the detecting pin by 180 degrees around the Z axis;

move the 180-degree rotated detecting pin along the Y axis to bring the third point of the detecting pin into contact with the second detection point, and acquire an eighth coordinate value indicative of a third coordinate of the second detection point;

move the 180-degree rotated detecting pin along the Y axis to bring the fourth point of the detecting pin into contact with the second detection point, and acquire a ninth coordinate value indicative of a fourth coordinate of the second detection point;

generate a second linear equation in accordance with the sixth coordinate value, the seventh coordinate value, the eighth coordinate value, the ninth coordinate value, the fourth height, and the fifth height, the second linear equation including the third height as a variable; and correct a tenth coordinate value indicative of a coordinate of the second measurement point using the second linear equation, the tenth coordinate value being obtained by bringing the predetermined point of the detecting pin into contact with the second measurement point.

* * * * *